(12) United States Patent
Harrison et al.

(10) Patent No.: US 10,095,598 B2
(45) Date of Patent: *Oct. 9, 2018

(54) TRANSACTION SERVER PERFORMANCE MONITORING USING COMPONENT PERFORMANCE DATA

(71) Applicant: International Business Machines Corporation, Armonk, NY (US)

(72) Inventors: Jim A. Harrison, Warwick (GB); Rob C. Jones, Winchester (GB); Phil R. Lee, Winchester (GB); Andy Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,707

(22) Filed: Jun. 12, 2013

(65) Prior Publication Data

US 2014/0019403 A1    Jan. 16, 2014

Related U.S. Application Data

(63) Continuation of application No. 13/547,674, filed on Jul. 12, 2012.

(51) Int. Cl.
*G06F 11/00* (2006.01)
*G06F 11/34* (2006.01)
(Continued)

(52) U.S. Cl.
CPC ...... *G06F 11/3409* (2013.01); *G06F 11/3428* (2013.01); *G06N 5/02* (2013.01); *G06Q 10/0639* (2013.01); *H04L 41/0681* (2013.01); *H04L 41/147* (2013.01); *H04L 43/0817* (2013.01); *H04L 43/16* (2013.01); *H04L 41/5025* (2013.01)

(58) Field of Classification Search
CPC .. G06F 11/34; G06F 11/3409; G06F 11/3428; G06F 11/0703; G06F 11/0706; G06F 11/0709; G06F 11/0721; G06F 11/0736; H04L 43/0817; H04L 43/16; H04L 41/0681; H04L 41/147;
(Continued)

(56) References Cited

U.S. PATENT DOCUMENTS 6,845,474 B2 *  1/2005  Circenis et al. ............ 714/48
6,986,076 B1 *  1/2006  Smith et al. ............. 714/4.11
(Continued)

*Primary Examiner* — Michael Maskulinski
(74) *Attorney, Agent, or Firm* — Steven M. Greenberg, Esq.; CRGO Law

(57) ABSTRACT

Embodiments of the present invention provide a method, system and computer program product for predicting transaction server performance failure in a transaction processing environment. In an embodiment of the invention, a method for predicting transaction server performance failure in a transaction processing environment is provided. The method includes receiving a performance metric for a transaction server during nominal operation of the transaction server in memory of a computing system and comparing the performance metric to a benchmark of performance metrics for the transaction server. Thereafter, in response to the performance metric falling outside a threshold variance from the benchmark, an alert is generated of a potential impending failure of the transaction server.

5 Claims, 2 Drawing Sheets

(51) Int. Cl.
*G06N 5/02* (2006.01)
*H04L 12/26* (2006.01)
*H04L 12/24* (2006.01)
*G06Q 10/06* (2012.01)

(58) Field of Classification Search
CPC ............ H04L 41/5019; H04L 41/5025; G06Q 10/0639; G06N 5/02
See application file for complete search history.

(56) References Cited

U.S. PATENT DOCUMENTS

| | | | |
|---|---|---|---|
| 7,107,339 B1* | 9/2006 | Wolters | H04L 41/142 709/224 |
| 7,797,415 B2 | 9/2010 | Peracha | |
| 8,326,971 B2* | 12/2012 | Dickerson et al. | 709/224 |
| 2004/0225923 A1* | 11/2004 | Teegan et al. | 714/38 |
| 2009/0240742 A1* | 9/2009 | Burghard et al. | 707/202 |
| 2012/0124193 A1* | 5/2012 | Ebrahim | H04L 41/0663 709/224 |

* cited by examiner

TRANSACTION SERVER PERFORMANCE MONITORING USING COMPONENT PERFORMANCE DATA

CROSS-REFERENCE TO RELATED APPLICATIONS

This application claims priority to U.S. patent application Ser. No. 13/547,674, currently pending, filed Jul. 12, 2012, the entirety of which are incorporated herein by reference.

BACKGROUND OF THE INVENTION

Field of the Invention

The present invention relates to transaction server management and more particularly to transaction server performance monitoring.

Description of the Related Art

A transaction server manages business transactions over a computer communications network. The transaction server typically is positioned between the client computing device and the application server providing the business application logic and acts as glue, holding essential data processing activities together. Importantly, the transaction server allows an enormous volume of information to remain accurate and ensures transactions are completed without interruption or data corruption. To achieve the foregoing, generally a transaction server provides for "roll back" capability through the implementation of the "ACID" set of properties—namely atomicity, consistency, isolation and durability. Thus, the transaction server is responsible for maintaining high performance, availability and data integrity and ensures that no computer has too much or too little to do.

A transaction server can be a software application executing in memory of a computer forming a composite device, or a transaction server can be a software application executing in memory of a computer also hosting the execution of other applications, whether in the same process address space or in a separate process address space, such as in a separate virtual machine. An example of a transaction server is the "customer information control system" (CICS) online transaction processing application. CICS along with the COBOL programming language has provided the backbone of enterprise mainframe computing for several decades and more recently has been supported in the mid-range and network personal computing environments.

In a transaction server environment, the health and stability of the transaction server can be measured according to many different measurable metrics. Most traditionally, log messages can be examined in which abnormal events or conditions have been reported. Also, independent monitoring logic can monitor system resources in order to generate an alert or to log a message when a threshold has been exceeded in any given resource including memory or processor usage. Yet further, performance metrics can be captured during the operation of the transaction server and analyzed at a later time to retro-reflectively identify poor health of the transaction server. Finally, of course, end user feedback of slow performance can always act as an impetus for identifying poor health in a transaction server.

Nevertheless, in all circumstances, conventional health monitoring methodologies are retrospective resulting in a determination of poor health only after the failure in the transaction server has occurred. Yet, in many cases awaiting a retrospective identification of poor health in a transaction server can be too little too late. Further, the failing state of a transaction server may not be evident from monitoring the successful completion of transactions whose successful completion may not be indicative of internally failing components of the transaction server.

BRIEF SUMMARY OF THE INVENTION

Embodiments of the present invention address deficiencies of the art in respect to transaction server performance monitoring and provide a novel and non-obvious method, system and computer program product for predicting transaction server performance failure in a transaction processing environment. In an embodiment of the invention, a method for predicting transaction server performance failure in a transaction processing environment is provided. The method includes receiving a performance metric for a transaction server during nominal operation of the transaction server in memory of a computing system and comparing the performance metric to a benchmark of performance metrics for the transaction server. Thereafter, in response to the performance metric falling outside a threshold variance from the benchmark, an alert is generated of a potential impending failure of the transaction server.

In one aspect of the embodiment, the performance metric is a measure of time consumed in processing a transaction in the transaction server and wherein the benchmark is a benchmark measure of time consumed in processing a transaction. In another aspect of the embodiment, the nominal operation of the transaction server occurs when the transaction server operates within specified terms of an associated service level agreement (SLA). In yet another aspect of the embodiment, the performance metric is received for a component of the transaction server, and the benchmark is a benchmark of performance metrics for the component of the transaction server. Finally, in even yet another aspect of the embodiment, a configuration parameter of the component is adjusted in response to the performance metric for the component falling outside the threshold variance from the benchmark for the component.

In another embodiment of the invention, a transaction data processing system can be configured for predicting transaction server performance failure. The system includes a computing system that includes at least one computer with memory and at least one processor. A transaction server can execute in the computing system in accordance with terms of an SLA and a data store of performance metrics measured during nominal operation of the transaction server in accordance with the terms of the SLA can be provided. Finally, a predictive performance module can be coupled to the data store and can execute in the memory of the computing system. The module includes program code enabled to receive a performance metric for the transaction server during the nominal operation of the transaction server, to compare the received performance metric to a benchmark of performance metrics computed from the performance metrics in the data store, and to respond to the received performance metric falling outside a threshold variance from the benchmark by generating an alert of a potential impending failure of the transaction server.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for predicting transaction server performance failure in a transaction processing environment. In accordance with an embodiment of the invention, performance metrics for a nominal state of a transaction server can be collected and stored. Thereafter, performance metrics for a contemporary state of the transaction server can be collected and compared to the stored state. To the extent that a threshold variance can be determined between the performance metrics of the contemporary state and the stored performance metrics, a remedial measure can be triggered such as automated tuning of one or more components of the transaction server, or messaging an administrator of a health deterioration of the transaction server.

Figure 1:
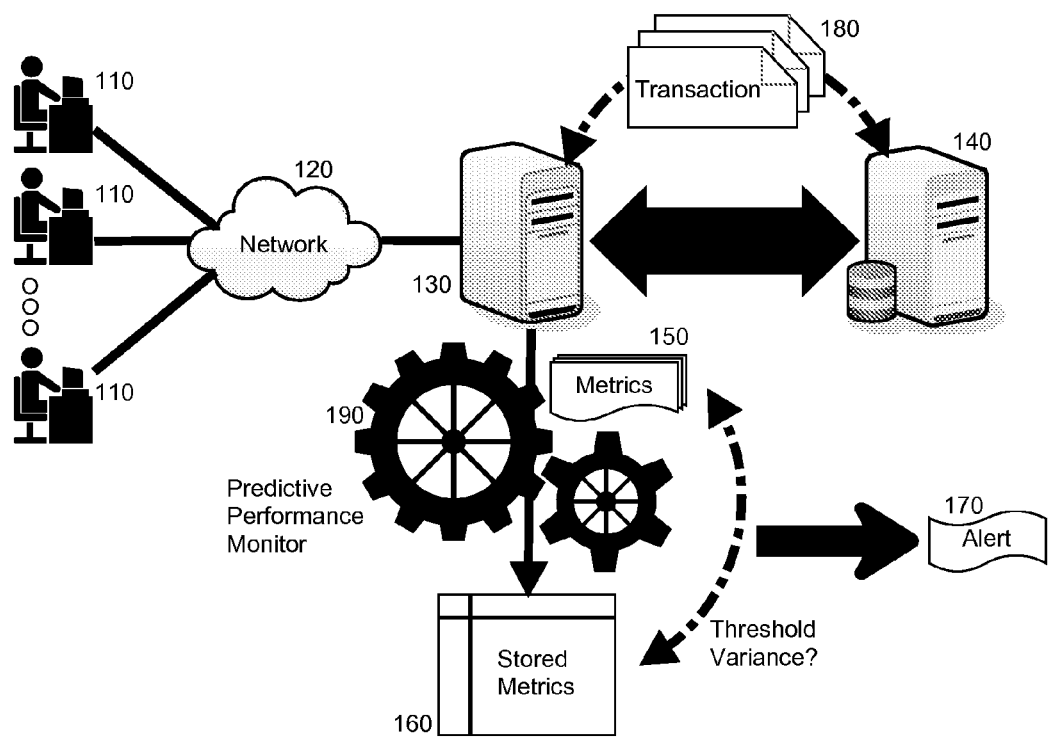
FIG. 1 is a pictorial illustration of a process for predicting transaction server performance failure in a transaction processing environment.

In further illustration, FIG. 1 pictorially shows a process for predicting transaction server performance failure in a transaction processing environment. As shown in FIG. 1, different end users 110 can interact over computer communications network 120 with a transaction server 130 mediating transactions 180 with a backend database management system 140. Performance metrics 150 can be collected for different components of the transaction server 130 during the nominal processing of the transactions 180 by a predictive performance monitor 190. The performance metrics 150, once collected, can be aggregated into a data store of metrics 160 and the aggregation of the performance metrics can be used to determine a benchmark of performance for the processing of the transactions 180 for each of the components of the transaction server 130.

Thereafter, as performance metrics 150 are contemporaneously collected for the processing of the transactions 180, the predictive performance monitor can compare the contemporaneously collected ones of the performance metrics 150 for different components of the transaction server 130 to correspondingly computed benchmarks for the components. To the extent a threshold variance is detected between a contemporaneously collected one of the performance metrics 150 for a particular component of the transaction server 130 and a corresponding benchmark for the component of the transaction server 130, an alert 170 can be generated so as to alert an administrator of the likely deteriorating performance of the transaction server 130 in respect to the particular component. Optionally, one or more configuration parameters for the particular component of the transaction server 130 associated with the contemporaneously collected one of the performance metrics 150 can be adjusted to account for the detected threshold variance.

Figure 2:
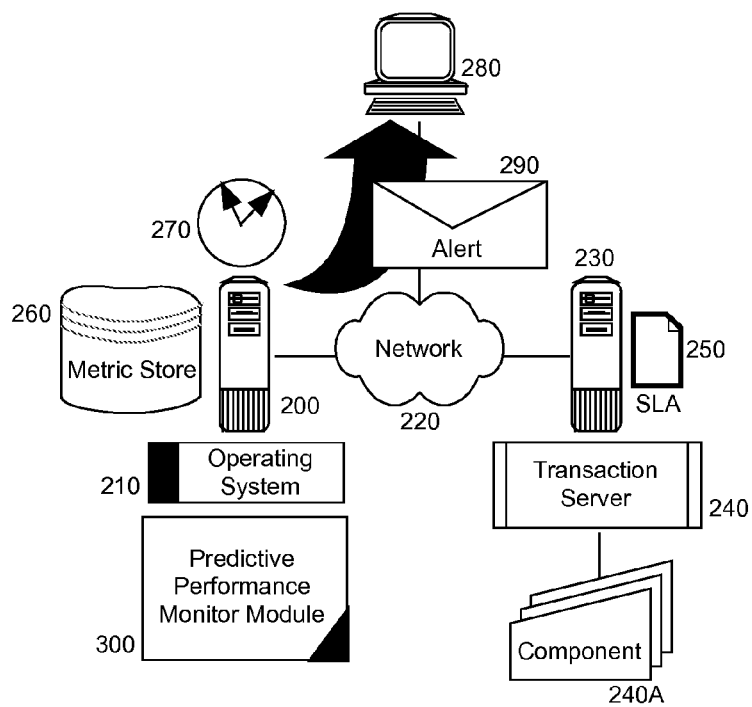
FIG. 2 is a schematic illustration of a transaction data processing system configured for predicting transaction server performance failure; and, FIG. 3 is a flow chart illustrating a process for predicting transaction server performance failure in a transaction processing environment.

The process described in connection with FIG. 1 can be implemented in a transaction monitoring data processing system. In yet further illustration, FIG. 2 schematically shows a transaction monitoring data processing system configured for predicting transaction server performance failure. The system can include a host computing system 230 the includes one or more server computers each with memory and at least one processor. The host computing system 230 can support the execution of a transaction server 240 processing transactions on behalf of different requestors in accordance with the terms of an SLA 250 for the transaction server 240. As shown in FIG. 2, the transaction server 240 can be a component based implementation of a transaction server in which an aggregation of different computing components 240A combine to provide the functionality of the transaction server 240.

The host computing system 230 can be coupled over computer communications network 220 to host computing system 200, also which can include one or more server computers each with memory and at least one processor. The host computing system 200 can support the operation of an operating system 210 which in turn can host the execution of predictive performance monitor module 300. Of note, while the host computing systems 200, 230 are shown to be separate, in one aspect of the embodiment, only a single one of the host computing systems 200, 230 can support concurrently the execution of the transaction server 240 and the predictive performance monitor module 300.

The predictive performance module 300 can include program code that when executed in the memory of the host computing system 200 can monitor transactions processed by the transaction server 230 during nominal operating conditions within the confines of the terms of the SLA 250. In this regard, the program code can maintain timestamps according to clock 270 of transactions as the transactions enter the logic of a particular one of the components of the transaction server 240 and are completed by the particular one of the components of the transaction server 240 so as to determine a total time during which each transaction is pending in the transaction server 240 in association with the particular one of the components 240A. The timestamps and/or the total time in turn can be stored in a metric store 260.

Thereafter, a benchmark based upon the metrics in the metric store 260 can be computed for each of the components 240A, for example a running average of time during which a transaction pends in a corresponding one of the components 240A of the transaction server 240 during nominal operation of the transaction server 240. Consequently, as the program code of the predictive performance module 300 determines the metrics for contemporaneously processed transactions in the components 240A of the transaction server 240, those metrics can be compared to corresponding benchmarks for the components 240A in order to detect a threshold variance. In response to detecting a threshold variance for a particular one of the components 240A, the program code can issue an alert 290 to an administrator 280 of the transaction server 240 and, optionally, one or more configuration parameters of the particular one of the components 240A can be adjusted programmatically, for example according to a pre-programmed rule or value.

Figure 3:
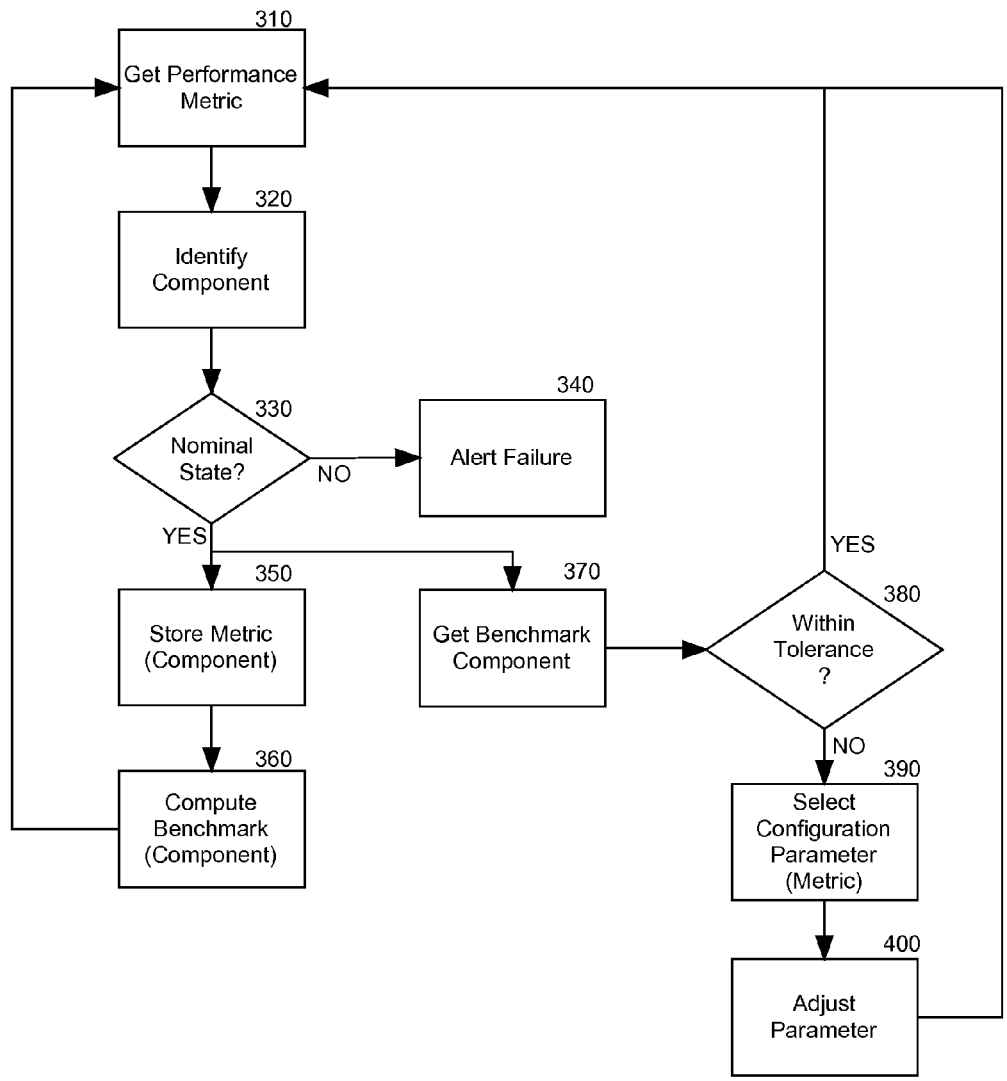

In even yet further illustration of the operation of the predictive performance monitor module 300, FIG. 3 is a flow chart illustrating a process for predicting transaction server performance failure in a transaction processing environment. Beginning in block 310, a performance metric can be received in association with a component of a transaction server. In block 320, the associated component can be identified and in decision block 330, it can be determined whether or not the transaction server is operating in a nominal state, for example in accordance with the requirements of an SLA for the transaction server. If not, an alert can be generated indicating that the performance of the transaction server has failed the limitations of the SLA. Otherwise, in block 350, the received metric can be stored in a data store of metrics in association with the component. Thereafter, in block 360 a benchmark can be computed for the metrics of the component and the process can return to block 310.

Returning to decision block 330, if it is determined that the transaction server is operating in a nominal state, a benchmark for the component can be retrieved in block 370. In decision block 380 it can be determined whether or not the received metric associated with the component falls within a tolerated variation of the benchmark for the component. If so, the process can return to block 310 in which a new performance metric can be retrieved. However, if in decision block 380 it is determined that the received metric associated with the component falls outside of the tolerated variation of the benchmark for the component, in block 390 a configuration parameter for the component can be selected and in block 400 the parameter can be adjusted in an attempt to remediate the cause of the intolerant variation. For example, a table can be consulted for a specified value for the parameter, or a value for the parameter can be adjusted according to a programmatic rule or programmatically specified value. In this way, the transaction server can autonomically adjust its operation during periods of nominal operation in anticipation of an impending failure condition that has not yet occurred.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for predicting transaction server performance failure in a transaction processing environment, the method comprising:

aggregating performance metrics of a transaction server mediating transactions with a backend database management system, the performance metrics comprising measured values relating to the performance of different components of the transaction server and measured for the different components of the transaction server when the transaction server is determined to be operating within requirements set forth in a service level agreement (SLA) for the transaction server, the performance metrics comprising a running average of time during which a transaction remains pending in the transaction server in association with a corresponding one of the different components;

utilizing the aggregated performance metrics to determine a benchmark of performance for mediating the transactions with the backend database management system for each of the components of the transaction server by maintaining timestamps according to a clock of each of the transactions as each of the transactions enter logic of a corresponding one of the components of the transaction server and are completed by the corresponding one of the components of the transaction server so as to determine a total time during which each of the transactions is pending in the transaction server in association with a corresponding one of the components;

receiving after the aggregation and determination of the benchmark, a performance metric for the transaction server during nominal operation of the transaction server in memory of a computing system when the transaction server is determined to be operating within the requirements set forth in the SLA for the transaction server;

comparing the received performance metric to the benchmark; and, responsive to the received performance metric falling outside a threshold variance from the benchmark, generating an alert of a potential impending failure of the transaction server, selecting a configuration parameter for a component of the transaction server corresponding to the received performance metric, locating in a table of parameters and adjustment values, a specified adjustment value for the selected configuration parameter, and adjusting the selected configuration parameter by the specified adjustment value so as to avoid the transaction server operating outside of the requirements of the SLA.

2. The method of claim 1, wherein the performance metric is a measure of time consumed in processing a transaction in the transaction server and wherein the benchmark is a benchmark measure of time consumed in processing a transaction.

3. The method of claim 1, wherein the performance metric is received for a component of the transaction server.

4. The method of claim 3, wherein the benchmark is a benchmark of performance metrics for the component of the transaction server.

5. The method of claim 4, wherein a configuration parameter of the component is adjusted in response to the performance metric for the component falling outside the threshold variance from the benchmark for the component.

* * * * *